(12) United States Patent
Yang et al.

(10) Patent No.: US 12,424,840 B2
(45) Date of Patent: Sep. 23, 2025

(54) GENERATOR CIRCUIT BREAKER CONTROL METHOD BASED ON SHORT-CIRCUIT FAULT CURRENT SYMMETRY

(71) Applicant: XI'AN JIAOTONG UNIVERSITY, Shaanxi (CN)

(72) Inventors: Fei Yang, Shaanxi (CN); Mingzhe Rong, Shaanxi (CN); Jinru Sun, Shaanxi (CN); Yifei Wu, Shaanxi (CN); Chunping Niu, Shaanxi (CN); Yi Wu, Shaanxi (CN); Jun Wang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 167 days.

(21) Appl. No.: 18/543,530

(22) Filed: Dec. 18, 2023

(65) Prior Publication Data
US 2024/0235180 A1    Jul. 11, 2024

(30) Foreign Application Priority Data
Jan. 9, 2023    (CN) .......................... 202310029433.9

(51) Int. Cl.
*H02H 7/06*    (2006.01)
*H02H 1/00*    (2006.01)

(52) U.S. Cl.
CPC ............ *H02H 7/06* (2013.01); *H02H 1/0007* (2013.01)

(58) Field of Classification Search
CPC ............................... H02H 7/06; H02H 1/0007
See application file for complete search history.

(56) References Cited

U.S. PATENT DOCUMENTS

| 11,837,865 | B2* | 12/2023 | Qi ............................. | H02H 9/02 |
| 2014/0376140 | A1* | 12/2014 | Wu ........................ | H02H 3/087 361/100 |
| 2018/0137993 | A1* | 5/2018 | Rong .................... | H02H 3/087 |
| 2018/0138689 | A1* | 5/2018 | Wu ........................ | H01H 9/542 |
| 2020/0106258 | A1* | 4/2020 | Mehraeen ............. | H02H 1/063 |

* cited by examiner

*Primary Examiner* — Scott Bauer

(57) ABSTRACT

The disclosure discloses a generator circuit breaker control method based on short-circuit fault current symmetry. The method includes: collecting, by a control device, current on an outlet side of a generator 7 real time; calculating a transferring current feeding moment based on a current symmetry method when fault current rises to a peak value after a short-circuit fault occurs; correcting the transferring current feeding moment by a correction coefficient; and then calculating a breaker switching moment, thereby realizing precise control on a generator circuit breaker. The method mainly addresses the situation that the existing control method cannot effectively cope with the complexity of the short-circuit fault current on the outlet side of the generator, and fills the blank of the effective method for short-circuit control of the generator circuit breaker.

10 Claims, 2 Drawing Sheets

GENERATOR CIRCUIT BREAKER CONTROL METHOD BASED ON SHORT-CIRCUIT FAULT CURRENT SYMMETRY

CROSS-REFERENCE TO RELATED APPLICATION

This application claims priority from the Chinese patent application 2023100294339 filed Jan. 9, 2023, the content of which is incorporated herein in the entirety by reference.

TECHNICAL FIELD

The present disclosure belongs to the field of generator circuit breakers, and relates to a fast generator circuit breaker control method based on short-circuit current symmetry.

BACKGROUND

In recent years, as electric power systems continue to develop, voltage levels are increased continuously, and capacity of a single generator is increased continuously, resulting in severe short-circuit faults occurring to an outlet side of a generator. Therefore, there is a need for disconnection of the short-circuit current of a generator circuit breaker to minimize the short-circuit influence, and to protect the normal stable operation of the generator and the electric power system.

Currently, the generator circuit breakers on the market generally use a conventional SF6 manner, which has a long fault disconnection time and a low disconnection current level, and does not meet the development requirements for environmental protection of electric power equipment in the future. The current transferring type generator circuit breaker formed by the electronic components and the mechanical circuit breaker can disconnect short-circuit faults at higher current levels, and has a fast disconnection speed, which can effectively solve the problems of the conventional circuit breaker. However, the current transferring type generator circuit breaker places higher demands on the control method. The existing control method highly depends on the short-circuit current calculation expression, and has the problems that the calculation expression for short-circuit fault current on an outlet side of the generator is too complex, and the switching moment cannot be predicted rapidly and accurately.

The above information disclosed in the background section merely serves to enhance the understanding of the background of the present disclosure, and thus may contain technical information of prior art that is not well known to those of ordinary skill in the art.

SUMMARY

In view of the problems existing in the prior art, the present disclosure provides a generator circuit breaker control method based on short-circuit fault current symmetry, which has high universality and is less influenced by interferences.

An objective of the present disclosure is achieved by the following technical solutions.

A generator circuit breaker control method based on short-circuit fault current symmetry, includes the following steps:

step 1, disposing a main branch and a transfer branch on a generator circuit breaker, setting a correction coefficient α based on simulation of a short-circuit fault on an outlet side of a generator and measured short-circuit current data, and setting an early switching time threshold ε, a transferring current value $I_{zy}$, and circuit breaker disconnection waiting time β according to requirements of the generator circuit breaker;

step 2, collecting current on the outlet side of the generator in real time, a short-circuit fault occurring to the outlet side of the generator at a moment $T_0$; when $I_{N-1}<I_{zy}<I_N$, capturing a moment at which a current value is equal to the transferring current value at a current rising stage and recording the moment as a moment $T_1$; when $I_{N'-2}<I_{N'-1}>I_{N'}$, capturing a moment at which the short-circuit current rises to the peak value and recording the moment as a moment $T_2$, collecting current on the outlet side of the generator by discrete means, and denoting the moment $T_0$ at which the short-circuit fault occurs to the outlet side of the generator as a 0 sampling point; $I_{N-1}$ representing a current value at a (N−1)th sampling point, $I_N$ representing a current value at a Nth sampling point, $I_{N'-2}$ representing a current value at a (N'−2)th sampling point, $I_{N'-1}$ representing a current value at a (N'−1)th sampling point, and $I_{N'}$ representing a current value at a N'th sampling point; transforming discrete time coordinates into continuous time coordinates, to obtain $T_1 \approx (N-1)\Box\Delta t+\delta$, $T_2 \approx (N'-1)\Box\Delta t+\delta$, wherein $\Delta t$ is a sampling interval;

step 3, starting to predict a transferring current feeding moment $T_4$ and a main branch early switching moment $T_3$ when a current peak value is collected, correcting the transferring current feeding moment $T_4$ by the correction coefficient α, wherein $T_4=\alpha\Box(T_2-T_1)+T_2$, predicting the main branch early switching moment $T_3=T_4-\varepsilon$ by the early switching time threshold ε, and calculating generator circuit breaker switching waiting time $T_{wait}$, wherein $T_{wait}=T_3-T_2=\alpha(T_2-T_1)-\varepsilon$, α is the correction coefficient; ε is the early switching time threshold; $T_1$ is the moment at which the short-circuit current rises to the transferring current value; $T_2$ is a short-circuit current peak value moment;

step 4, waiting for generator circuit breaker switching waiting time $T_{wait}$ after the short-circuit current peak value moment, and performing a circuit breaker switching command;

step 5, when the current drops to the transferring current $I_{zy}$, feeding the transferring current through the transfer branch such that the short-circuit current on the main branch drops rapidly to 0 to realize rapid disconnection of the main branch; and step 6, waiting for fixed time β after feeding the transferring current, and implementing disconnection of a fault circuit of the circuit breaker at a moment $T_5$.

According to the method, in step 1, the correction coefficient α is 0.85-1.

According to the method, in step 1, when the correction coefficient α is 1 when the generator short-circuit fault current has an axisymmetric waveform.

According to the method, in step 1, the early switching time threshold ε is a minimum time threshold for successful disconnection of contacts of the generator circuit breaker, and the early switching time threshold ε is a constant value.

According to the method, in step 2, the current peak value is a current peak value in a first halfwave.

According to the method, in step 2, δ is Δt/2.

According to the method, the transfer branch includes a current transferring and damping module.

According to the method, the correction coefficient α is 0.9.

According to the method, the transferring current feeding moment $T_4$ is the moment at which a short-circuit current value is equal to the transferring current value $I_{zy}$ after the short-circuit current decreases from the peak value.

According to the method, in step 5, the moment at which the transferring current is fed through the transfer branch is determined based on the moment at which the transferring current value is collected by the control device.

Advantageous Effects

The present disclosure provides a method to calculate the time difference between the transferring current value moment and the current peak value moment during the rise of the short-circuit current. When the current rises to a maximum value, the circuit breaker switching waiting time is calculated by a formula, the calculation amount is small, the short-circuit fault can be disconnected within one cycle, and the problem that the conventional control method is complex in principle and the algorithm is long in calculation time can be effectively solved. The existing control method highly depends on the mathematical expressions of the short-circuit current, which cannot adapt to the complex situation of the short-circuit current at the outlet side of the generator. The control method based on short-circuit current symmetry of the present disclosure predicts the circuit breaker switching moment by the time difference between the transferring current moment and the current peak value moment at the short-circuit current rising stage, performs correction by the correction coefficient, the achieves a small prediction deviation, and can adapt to various short-circuit situations.

BRIEF DESCRIPTION OF THE DRAWINGS

Various additional advantages and benefits of the present disclosure will become apparent to those of ordinary skill in the art upon reading the following detailed description of the preferred embodiments. The drawings are only for the purpose of illustrating preferred embodiments and are not considered to be limitation of the present disclosure. It is obvious that the drawings described below are merely some embodiments of the present disclosure, and those of ordinary skill in the art can also obtain other drawings according to these drawings without creative efforts. Moreover, same reference numerals refer to same parts throughout the drawings In the drawings.

Figure 1:
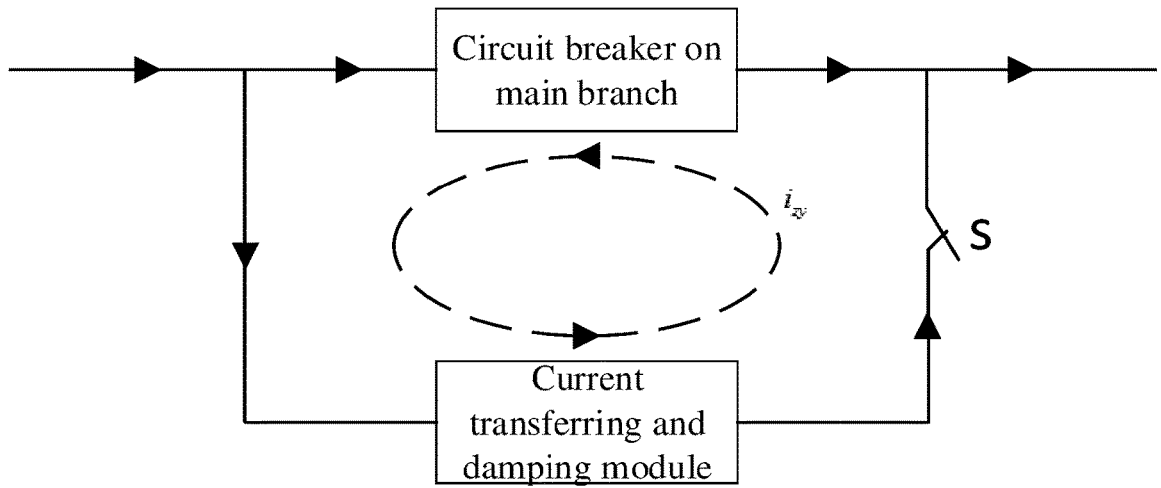
FIG. 1 is a schematic diagram of a current transferring type generator circuit breaker according to an embodiment of the present disclosure.

The present disclosure is further explained below with reference to the drawings and embodies.

DETAILED DESCRIPTION OF THE EMBODIMENTS

The specific embodiments of the present disclosure will be described in more detail below with reference to the FIGS. 1-3. Although the specific embodiments of the present disclosure are illustrated in the drawings, it should be understood that the present disclosure may be implemented in various forms and should not be construed as being limited to the embodiments set forth herein. On the contrary, these embodiments are provided so that the present disclosure will be more fully understood, and will fully convey the scope of the present disclosure to those skilled in the art.

It should be noted that certain terms are used throughout the description and claims to refer to certain components. Those skilled in the art that should understand that different terms may be used by technicians to refer to the same component. The description and claims do not use differences in nouns as a way to distinguish components, but use differences in function of components as criteria for distinguishing. "Comprise" or "include" as referred to throughout the description and claims, is an open-ended language that is to be interpreted as "including, but not limited to". The following description describes preferred embodiments for implementing the present disclosure, but the description is for the purpose of general principles of the description and is not intended to limit the scope of the present disclosure. The scope of the present disclosure is defined by the appended claims.

In order to facilitate the understanding of the embodiments of the present disclosure, several specific embodiments will be further described by way of example with reference to the drawings that are not to be construed as limiting the embodiments of the present disclosure.

As shown in FIG. 1, the present disclosure is applied to a current transferring type generator circuit breaker, wherein current flows through a circuit breaker on a main branch when a generator is in a normal operation state. The circuit breaker on the main branch and a circuit breaker S on a transfer branch are both fast circuit breakers driven by a fast repulsion mechanism, which can achieve fast switching after triggering. As shown in FIG. 2, at a moment $T_0$, a short-circuit fault occurs in a generator system, and rapidly increasing short-circuit current flows across the circuit breaker on the main branch. When the short-circuit current drops to a transferring current value $I_{zy}$, a current transferring module feeds transferring current $i_{zy}$ in a direction opposite to the current of the main branch, forcing the current on the main branch to quickly cross zero, thereby disconnecting the main branch. Due to the limitation of the circuit breaker disconnecting capability, the circuit breaker on the main branch needs the early switching time ε, i.e., start switching at a moment $T_3$. Successful disconnection of the circuit breaker on the main branch is achieved after the transferring current is fed and contacts of the circuit breaker on the main branch reach a certain opening distance. Thereafter, system current flows through a damping module and is further substantially reduced in magnitude by the current limiting effect of the damping module. The circuit breaker S disconnects quickly after current limitation, the circuit breaker S disconnects the short-circuit fault circuit completely at a moment $T_5$ after waiting for fixed time β.

In a current transferring type generator circuit breaker system, the current transferring value $I_{zy}$, the early switching time ε and circuit breaker S disconnection waiting time β are known fixed values determined based on the features of the system short-circuit current. The present disclosure provides a fast generator circuit breaker control method based on short-circuit current symmetry under the above disconnection principles and features, which can accurately predict the start of a switching moment $T_3$ of the circuit breaker on the main branch, and feeds transferring current when the short-circuit current drops to $I_{zy}$. After waiting for the fixed time β, the circuit breaker S is disconnected at the moment $T_5$, achieving the purpose of completely disconnecting the fault circuit finally.

In an embodiment, the present disclosure provides a generator circuit breaker control method based on short-circuit current symmetry, including the following steps.

Step 1: A correction coefficient α is reasonably set by combining simulation of a short-circuit fault on an outlet side of a generator and measured short-circuit current data. An early switching time threshold ε, a transferring current value $I_{zy}$, and circuit breaker S disconnection waiting time β are set according to requirements of the generator circuit breaker.

Step 2: Current on an outlet side of the generator is collected in real time. When a detection system detects a short-circuit fault (at a moment $T_0$), a control algorithm is started. When $I_{N-1}<I_{zy}<I_N$, a moment at which a current value is equal to the transferring current value $I_{zy}$ at a current rising stage is captured, and is recorded as $T_1$. When $I_{N'-2}<I_{N'-1}>I_{N'}$, a moment at which the short-circuit current rises to a peak value is captured and is recorded as $T_2$.

An actual control system collects the current on the outlet side of the generator by discrete means, and the moment $T_0$ at which the short-circuit fault occurs to the outlet side of the generator is denoted as a 0 sampling point. $I_{N-1}$ represents a current value at a (N−1)th sampling point, $I_N$ represents a current value at a Nth sampling point, $I_{N'-2}$ represents a current value at a (N'−2)th sampling point, $I_{N'-1}$ represents a current value at a (N'−1)th sampling point, and $I_{N'}$ represents a current value at a N'th sampling point. Discrete time coordinates are transformed into continuous time coordinates, to obtain $T_1 \approx (N-1)\Box\Delta t+\delta$, $T_2 \approx (N'-1)\Box\Delta t+\delta$, wherein Δt is a sampling interval, and δ is generally Δt/2 by default.

Step 3: A transferring current feeding moment $T_4$ and a main branch early switching moment $T_3$ start to be predicted when the current peak value is collected by a control device. Taking into account the influence of the decay of a DC component in the current on the outlet side of the generator, $T_4$ is corrected by setting the correction coefficient α in advance to calculate $T=\alpha\Box(T_2-T_1)+T_2$, and a moment $T_3=T_4-\varepsilon$ of a switching operation of the circuit breaker is predicted by the early switching time threshold ε. Generator circuit breaker switching waiting time $T_{wait}$ is calculated by the following formula.

$$T_{wait}=T_3-T_2=\alpha(T_2-T_1)-\varepsilon;$$

wherein, α is the correction coefficient;
ε is the early switching time;
$T_1$ is the moment at which the short-circuit current rises to the transferring current value; and
$T_2$ is the short-circuit current peak value moment.

Step 4: A circuit breaker switching command is performed waiting for $T_{wait}$ after the short-circuit current peak value moment.

Step 5: When the current drops to the transferring current $I_{zy}$, the transferring current is fed through a transfer branch such that the short-circuit current on the main branch drops rapidly to 0 to realize rapid disconnection of the main branch.

Step 6: The purpose of successful disconnection of a fault circuit of the circuit breaker S is finally implemented at the moment $T_5$ waiting for fixed time β after feeding the transferring current.

EMBODIMENT

The generator circuit breaker control method based on short-circuit current symmetry of this embodiment is applied within one cycle after a short-circuit fault occurs to an outlet side of a generator, and includes the following steps.

Step 1: A correction coefficient α is reasonably set by combining simulation of a short-circuit fault on an outlet side of a generator and measured short-circuit current data. An early switching time threshold ε, a transferring current value $I_{zy}$, and circuit breaker S disconnection waiting time β are set according to requirements of the generator circuit breaker.

Step 2: Current on an outlet side of the generator is collected in real time. When a detection system detects a short-circuit fault (at a moment $T_0$), a control algorithm is started. When $I_{N-1}<I_{zy}<I_N$, a moment at which a current value is equal to the transferring current value $I_{zy}$ at a current rising stage is captured, and is recorded as $T_1$. When $I_{N'-2}<I_{N'-1}>I_{N'}$, a moment at which the short-circuit current rises to a peak value is captured and is recorded as $T_2$.

An actual control system collects the current on the outlet side of the generator by discrete means, and the moment $T_0$ at which the short-circuit fault occurs to the outlet side of the generator is denoted as a 0 sampling point. $I_{N-1}$ represents a current value at a (N−1)th sampling point, IN represents a current value at a N th sampling point, $I_{N'-2}$ represents a current value at a (N'−2)th sampling point, $I_{N'-1}$ represents a current value at a (N'−1)th sampling point, and $I_{N'}$ represents a current value at a N'th sampling point. Discrete time coordinates are transformed into continuous time coordinates, to obtain $T \approx (N-1)\Box\Delta t+\delta$, $T_2 \approx (N'-1)\Box\Delta t+\delta$, wherein Δt is a sampling interval, and δ is generally Δt/2 by default.

Step 3: A transferring current feeding moment $T_4$ and a main branch early switching moment $T_3$ start to be predicted when the current peak value is collected by a control device. Taking into account the influence of the decay of a DC component in the current on the outlet side of the generator, $T_4$ is corrected by setting the correction coefficient α in advance to calculate $T_4=\alpha\Box(T_2-T_1)+T_2$, and a moment $T_3=T_4-\varepsilon$ of a switching operation of the circuit breaker is predicted by the early switching time threshold ε. Generator circuit breaker switching waiting time $T_{wait}$ is calculated by the following formula.

$$T_{wait}=T_3-T_2=\alpha\Box(T_2-T_1)-\varepsilon;$$

wherein, α is the correction coefficient;
ε is the early switching time;
$T_1$ is the moment at which the short-circuit current rises to the transferring current value; and
$T_2$ is the short-circuit current peak value moment.

Step 4: A circuit breaker switching command is performed waiting for $T_{wait}$ after the short-circuit current peak value moment.

Step 5: When the current drops to the transferring current $I_{zy}$, the transferring current is fed through a transfer branch such that the short-circuit current on the main branch drops rapidly to 0 to realize rapid disconnection of the main branch.

Step 6: The purpose of successful disconnection of a fault circuit of the circuit breaker S is finally implemented at the moment $T_5$ waiting for fixed time β after feeding the transferring current.

FIG. 1 is a schematic diagram of a current transferring type generator circuit breaker according to an embodiment of the present disclosure, wherein arrows indicate a current flowing direction. When a short-circuit fault occurs, the current on the main branch increases rapidly, and the current on the main branch can be rapidly reduced to zero by feeding current on the transfer branch in a direction opposite to the direction of the current on the main branch at the right time, facilitating the disconnection of contacts of the main branch. After the main branch is disconnected, the residual current flows through the damping module, and is subjected to a current limiting action, achieving the purpose of complete circuit disconnection through the circuit breaker S finally.

It is particularly noted that the generator circuit breaker control method based on short-circuit current symmetry of the present disclosure is only applied to the current transferring type generator circuit breaker in FIG. 1, and is not applicable to generator circuit breakers employing other principles.

Figure 2:
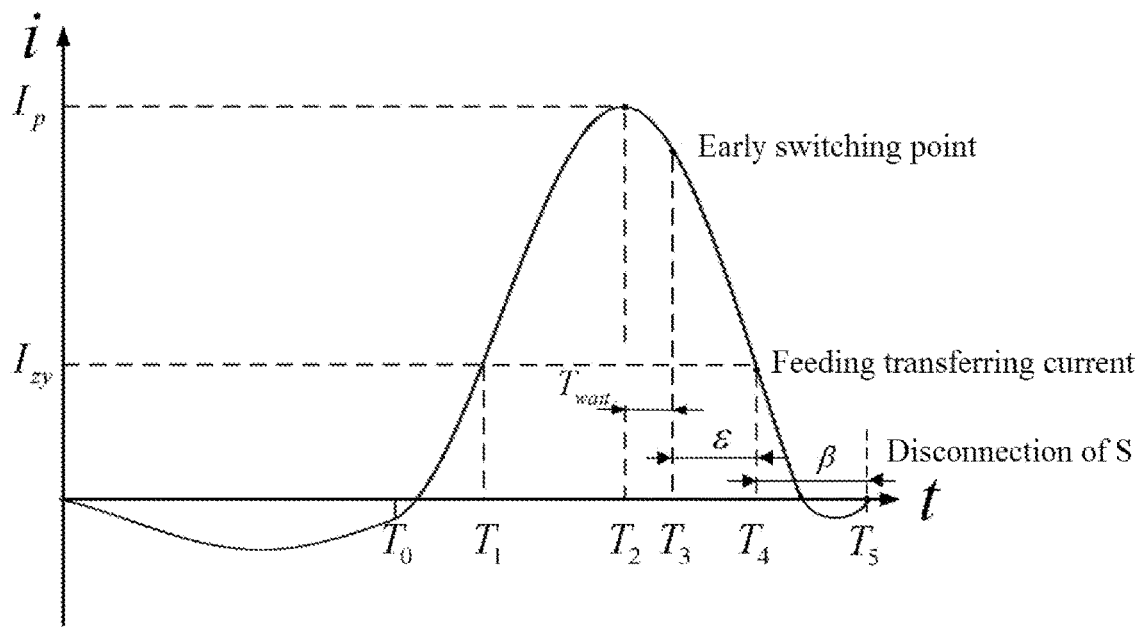
FIG. 2 is a schematic diagram of a short-circuit waveform time node according to an embodiment of the present disclosure.

FIG. 2 shows a current waveform diagram in an embodiment, wherein the current on the outlet side of the generator changes from steady-state current to transient current in waveforms, and meanwhile, FIG. 2 indicates important time nodes captured in the control method. When the short-circuit fault occurs at the moment $T_0$, the control device receives a signal to start the subsequent control method. With the continuous increase of the short-circuit current, the control device successively captures the transferring current value moment $T_1$ and the short-circuit current peak value moment $T_2$, and starts to predict the main branch early switching moment $T_3$ and the transferring current feeding moment $T_4$ at the moment $T_2$, and finally achieves complete disconnection of the fault circuit at the moment $T_5$.

Figure 3:
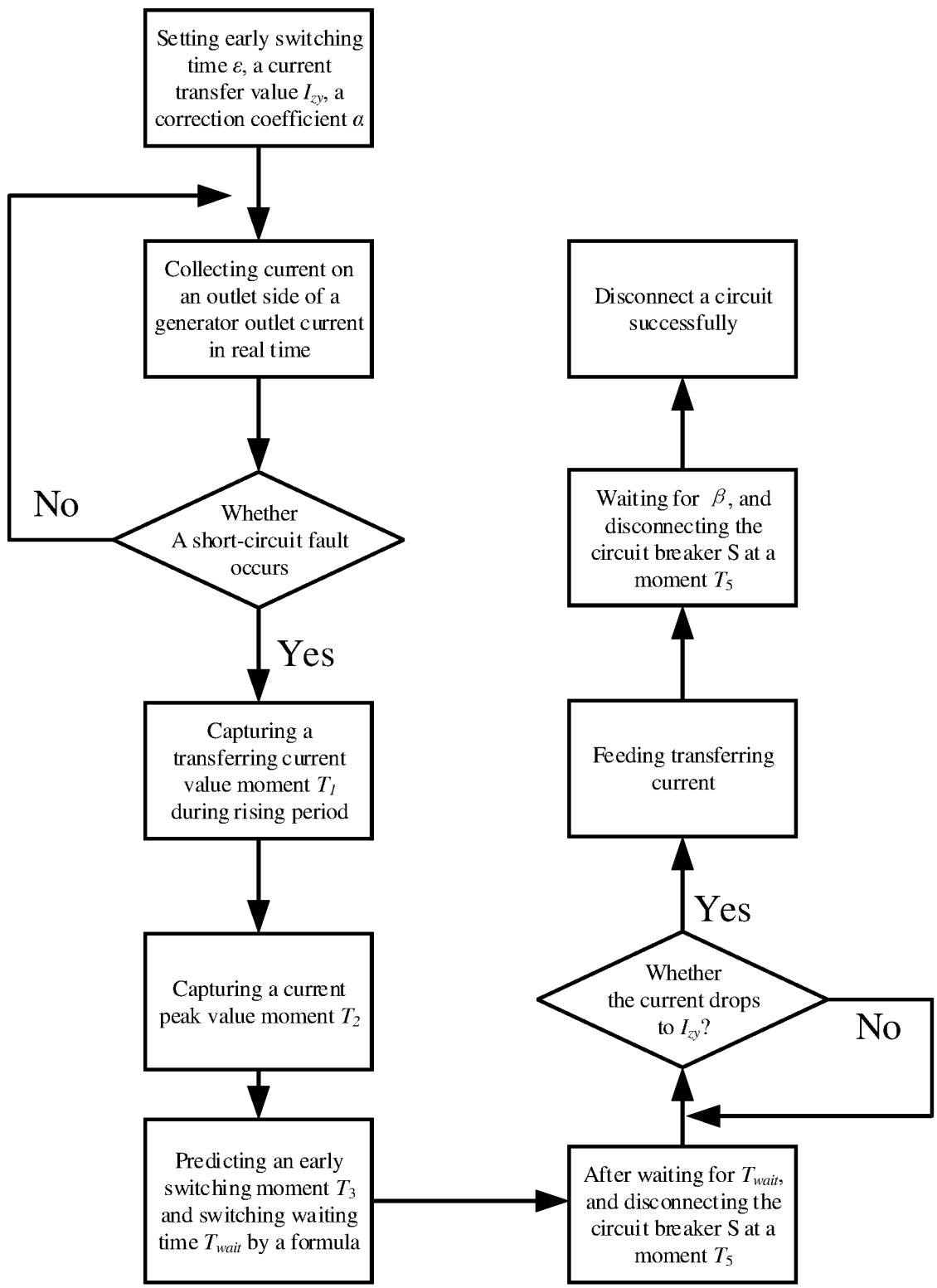
FIG. 3 is a flow chart showing control according to an embodiment of the present disclosure.

FIG. 3 is a flow chart showing the completion of control according to an embodiment, including the application of the generator circuit breaker control method based on short-circuit current symmetry, wherein the method for determining the short-circuit fault is selected by the control device itself, and the control method of the present disclosure is used after the short-circuit fault occurs.

In combination with FIGS. 2 and 3, the transferring current value should be set to a reasonable value, and in principle the control method of the present disclosure needs to only start capturing the transferring current value after receiving the short-circuit fault. An unreasonable setting can lead to failure of the control method, resulting in serious consequences. The correction coefficient $\alpha$ is set to 0.9 by default, and can generally satisfy the situation that the short-circuit fault occurs to the outlet side of the generator a generator outlet side short-circuit fault without modification.

Although the embodiments of the present disclosure have been described above with reference to the drawings, the present disclosure is not limited to the above specific embodiments and application fields, and the above specific embodiments are only illustrative, instructional, and not restrictive. Those of ordinary skill in the art, in the light of the present disclosure and without departing from the scope of the appended claims, will be able to make numerous forms that all fall within the scope of the present disclosure.

What is claimed is:

1. A generator circuit breaker control method based on short-circuit fault current symmetry, comprising the following steps:
    step 1, disposing a main branch and a transfer branch on a generator circuit breaker, setting a correction coefficient $\alpha$ based on simulation of a short-circuit fault on an outlet side of a generator and measured short-circuit current data, and setting an early switching time threshold $\varepsilon$, a transferring current value $I_{zy}$ and circuit breaker disconnection waiting time $\beta$ according to requirements of the generator circuit breaker;
    step 2, collecting current on the outlet side of the generator in real time, a short-circuit fault occurring to the outlet side of the generator at a moment $T_0$; when $I_{N-1} < I_{zy} < I_N$, capturing a moment at which a current value is equal to the transferring current value $I_{zy}$ at a current rising stage and recording the moment as a moment $T_1$; when $I_{N'-2} < I_{N'-1} > I_{N'}$, capturing a moment at which the short-circuit current rises to the peak value and recording the moment as a moment $T_2$, collecting current on the outlet side of the generator by discrete means, and denoting the moment $T_0$ at which the short-circuit fault occurs to the outlet side of the generator as a 0 sampling point; $I_{N-1}$ representing a current value at a (N-1)th sampling point, $I_N$ representing a current value at a N th sampling point, $I_{N'-2}$ representing a current value at a (N'-2)th sampling point, $I_{N'-1}$ representing a current value at a (N'-1)th sampling point, and $I_{N'}$ representing a current value at a N'th sampling point; transforming discrete time coordinates into continuous time coordinates, to obtain $T_1 \approx (N-1) \square \Delta t + \delta$, $T_2 \approx (N'-1) \square \Delta t + \delta$, wherein $\Delta t$ is a sampling interval;
    step 3, starting to predict a transferring current feeding moment $T_4$ and a main branch early switching moment $T_3$ when a current peak value is collected, correcting the transferring current feeding moment $T_4$ by the correction coefficient $\alpha$, wherein $T_4 = \alpha \square (T_2 - T_1) + T_2$, predicting the main branch early switching moment $T_3 = T_4 - \varepsilon$ by the early switching time threshold $\varepsilon$, and calculating generator circuit breaker switching waiting time $T_{wait}$,
    wherein $T_{wait} = T_3 - T_2 = \alpha \square (T_2 - T_1) - \varepsilon$, $\alpha$ is the correction coefficient; $\varepsilon$ is the early switching time threshold; $T_1$ is the moment at which the short-circuit current rises to the transferring current value; $T_2$ is a short-circuit current peak value moment;
    step 4, waiting for generator circuit breaker switching waiting time $T_{wait}$ after the short-circuit current peak value moment, and performing a circuit breaker switching command;
    step 5, when the current drops to the transferring current $I_{zy}$, feeding the transferring current through the transfer branch such that the short-circuit current on the main branch drops rapidly to 0 to realize rapid disconnection of the main branch; and
    step 6, waiting for fixed time $\beta$ after feeding the transferring current, and implementing disconnection of a fault circuit of the circuit breaker at a moment $T_5$.

2. The method according to claim 1, wherein preferably, in step 1, the correction coefficient $\alpha$ is 0.85-1.

3. The method according to claim 1, wherein in step 1, the correction coefficient $\alpha$ is 1 when the short-circuit fault current of the generator has an axisymmetric waveform.

4. The method according to claim 1, wherein in step 1, the early switching time threshold $\varepsilon$ is a minimum time threshold for successful disconnection of contacts of the generator circuit breaker, and the early switching time threshold $\varepsilon$ is a constant value.

5. The method according to claim 1, wherein in step 2, the current peak value is a current peak value in a first half wave.

6. The method according to claim 1, in step 2, $\delta$ is $2/\Delta t$.

7. The method according to claim 1, wherein the transfer branch includes a current transferring and damping module.

8. The method according to claim 1, wherein the correction coefficient $\alpha$ is 0.9.

9. The method according to claim 1, wherein the transferring current feeding moment $T_4$ is the moment at which a short-circuit current value is equal to the transferring current value $I_{zy}$ after the short-circuit current decreases from the peak value.

10. The method according to claim 1, wherein in step 5, the moment at which the transferring current is fed through the transfer branch is determined based on the moment at which the transferring current value is collected by the control device.

* * * * *